(12) United States Patent
Kawajiri et al.

(10) Patent No.: US 9,065,090 B2
(45) Date of Patent: *Jun. 23, 2015

(54) FUEL BATTERY

(75) Inventors: Kousuke Kawajiri, Kariya (JP); Keiji Hashimoto, Kariya (JP); Satoshi Futami, Kariya (JP); Tomokazu Hayashi, Seto (JP)

(73) Assignee: Toyota Shatai Kabushiki Kaisha, Aichi (JP)

(*) Notice: Subject to any disclaimer, the term of this patent is extended or adjusted under 35 U.S.C. 154(b) by 363 days.

This patent is subject to a terminal disclaimer.

(21) Appl. No.: 13/522,620

(22) PCT Filed: Dec. 16, 2010

(86) PCT No.: PCT/JP2010/072629
§ 371 (c)(1),
(2), (4) Date: Jul. 17, 2012

(87) PCT Pub. No.: WO2011/089801
PCT Pub. Date: Jul. 28, 2011

(65) Prior Publication Data
US 2012/0301810 A1    Nov. 29, 2012

(30) Foreign Application Priority Data

Jan. 19, 2010  (JP) ................. 2010-008854

(51) Int. Cl.
*H01M 8/02* (2006.01)
*H01M 8/04* (2006.01)
*H01M 8/10* (2006.01)

(52) U.S. Cl.
CPC ............ *H01M 8/026* (2013.01); *H01M 8/0263* (2013.01); *H01M 8/0265* (2013.01); *H01M 2008/1095* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

2010/0285384 A1    11/2010  Nakagawa et al.
2012/0028139 A1    2/2012   Kawajiri et al.

FOREIGN PATENT DOCUMENTS

| JP | 62-110261 A | 5/1987 |
| JP | 10-134833 A | 5/1998 |

(Continued)

OTHER PUBLICATIONS

English translation of PCT International Preliminary Report on Patentability issued by The International Bureau of WIPO issued on Aug. 7, 2012 for Application No. PCT/JP2010/072629 (6 pages).

(Continued)

*Primary Examiner* — Jonathan Crepeau
(74) *Attorney, Agent, or Firm* — James R. Gourley; Carstens & Cahoon, LLP

(57) ABSTRACT

A membrane electrode assembly (15) formed by a solid electrolyte membrane (16) and electrode catalyst layers (17, 18) is interposed between a pair of frames (13, 14). Gas diffusion layers (19, 20) are laminated onto the surface of the electrode catalyst layers (17, 18). A first gas passage forming member (21) is laminated onto the surface of the gas diffusion layer (19) while a second gas passage forming member (22) is laminated onto the surface of the gas diffusion layer (20). Separators (23, 24) contact surfaces of the frame (13, 14) and the first and second gas passage forming member (21, 22). A plurality of first and second straight grooves (21c, 21d) are formed on the first gas passage forming member (21), such that the widths (w1, w2) differ from each other, and cross-sectional areas of the paths for the first and second gas passages (T1, T2) differ from each other.

4 Claims, 8 Drawing Sheets

(56) References Cited

FOREIGN PATENT DOCUMENTS

| | | | |
|---|---|---|---|
| JP | 2000-251907 A | | 9/2000 |
| JP | 2004-186008 | * | 7/2004 |
| JP | 2004-186008 A | | 7/2004 |
| JP | 2006-331916 A | | 12/2006 |
| JP | 2007-207725 A | | 8/2007 |
| JP | 2007-207731 A | | 8/2007 |
| JP | 3135588 U | | 8/2007 |
| JP | 2007-265939 A | | 10/2007 |
| WO | 2010/047143 A1 | | 4/2010 |
| WO | WO 2010/113534 | * | 10/2010 |

OTHER PUBLICATIONS

PCT International Search Report issued by the International Bureau of WIPO dated Mar. 22, 2011 for Application No. PCT/JP2010/072629 (2 pages).

* cited by examiner

FUEL BATTERY

FIELD OF THE INVENTION

The present invention relates to a fuel cell for use in an electric vehicle or the like, and particularly relates to a fuel cell capable of improving the power generating performance.

BACKGROUND OF THE INVENTION

Generally, a fuel cell includes a fuel cell stack 11 formed by a plurality of power generation cells 12 stacked as shown in FIG. 13. As illustrated in FIG. 14, an electrode assembly 15 is placed at a joint portion of a pair of frames 13, 14 forming the respective power generation cells 12. The electrode assembly 15 includes a solid electrolyte membrane 16, an electrode catalyst layer 17 positioned on the anode side, and an electrode catalyst layer 18 positioned on the cathode side. An outer peripheral edge of the solid electrolyte membrane 16 is fixed by being sandwiched by both of the frames 13, 14. An anode-side gas diffusion layer 19 is laminated on a surface of the electrode catalyst layer 17, and a cathode-side gas diffusion layer 20 is laminated on a surface of the electrode catalyst layer 18. In addition, an anode-side first gas passage forming member 21 is laminated on a surface of the gas diffusion layer 19, and a cathode-side second gas passage forming member 22 is laminated on a surface of the gas diffusion layer 20. A tabular separator 23 is bonded to a surface of the first gas passage forming member 21, and a tabular separator 24 is bonded to a surface of the second gas passage forming member 22.

As shown in FIGS. 14 and 15, the first gas passage forming member 21 includes a base plate portion 21a, which comes into contact with the separator 23, and a protrusion 21b formed integrally on a surface of the base plate portion 21a. A straight groove 21c, which forms a gas passage T, is formed between adjacent protrusions 21b as a result of being blocked by the surface of the gas diffusion layer 19. The second gas passage forming member 22 has the same configuration as the gas passage forming member 21. In other words, the second gas passage forming member 22 includes a base plate portion 22a, which comes into contact with the separator 24, and a protrusion 22b formed integrally on a surface of the base plate portion 22a. A straight groove 22c, which forms a passage F, is formed between the adjacent protrusions 22b as a result of being blocked by the surface of the gas diffusion layer 20. Fuel gas, or hydrogen gas, is supplied to the gas passage T from a fuel gas introducing passage Ml formed on the power generation cells 12, and oxidation gas is supplied to the passage F from an oxidation gas, or oxygen gas, introducing passage R1 (refer to FIG. 13) also formed on the power generation cells 12. As a result of supplying the fuel gas and the oxidation gas, the fuel gas and the oxidation gas electrochemically react in the electrode assembly 15 and thereby generate power. The fuel off-gas and the oxidation off-gas that have not been used in the power generation are respectively discharged outside the power generation cells 12 through a fuel off-gas discharging passage M2 and an oxidation off-gas discharging passage R2 (refer to FIG. 13) formed on the power generation cells 12 (refer to Patent Document 1).

PRIOR ART DOCUMENT

Patent Document

Patent Document 1: Japanese Laid-Open Patent Publication No. 2007-207725

SUMMARY OF THE INVENTION

Problems that the Invention is to Solve

However, with a conventional fuel cell, as shown in FIGS. 14 and 15, the straight grooves 21c, 22c are formed in the same shape so that all the cross-sectional areas of the straight grooves 21c, 22c of the gas flow passage forming members 21, 22 are the same. Thus, the following problems arise. That is, as is known in the art, when power is generated by the power generation cells 12, water is generated in the cathode-side electrode catalyst layer 18 and the gas diffusion layer 20 due to the electrochemical reaction of hydrogen and oxygen. Since the fuel gas and the oxidation gas are respectively supplied to the power generation cells 12 in a state of being humidified by a humidifier in order to improve the power generating efficiency, humidifying water is supplied to the passages T, F. Some of water generated on the cathode-side seeps into the electrode assembly 15, and enters, as seepage water, the anode-side gas diffusion layer 19 and the straight groove 21c of the gas passage forming member 21.

When the foregoing generated water and humidifying water, as retained water W, become adhered to and remain on a wall surface of the straight groove 22c of the cathode-side second gas passage forming member 22, the flow amount of the oxidation gas flowing through the straight groove 22c will decrease due to the retained water W, and the generation of power is limited. In other words, as shown in FIG. 16, for example, if three straight grooves 22c; that is, if the passages F are blocked by the retained water W, oxidation gas is no longer supplied to the electrode catalyst layer 18 corresponding to a broad region A1 between the two protrusions 22b positioned at the outermost position of the straight grooves 22c. This lowers the power generating efficiency. To put it differently, since any straight groove 22c could become blocked by the retained water W, the number of straight grooves 22c that are blocked by the retained water W will increase as the amount of generated water and humidifying water becomes greater, there will be no end to the reduction in the power generating efficiency.

Moreover, among the stacked power generation cells 12 shown in FIG. 13, for instance, if the retained water W remains in all the passages T, F of a specific power generation cell 12 and the supply of fuel gas and oxidation gas is inhibited and the power generation cells 12 are unable to generate power, the continuation of power-generation becomes impossible. This is because the respective power generation cells 12 of the fuel cell stack 11 are electrically connected in series.

It is an objective of the invention is to provide a fuel cell capable of inhibiting reduction in the power generating efficiency.

To achieve the foregoing objective and in accordance with one aspect of the present invention, a fuel cell is provided that includes an electrolyte membrane including an anode surface and a cathode surface, a pair of electrode catalyst layers respectively laminated on the anode surface and on the cathode surface of the electrolyte membrane, a pair of gas flow passage forming members respectively laminated on the pair of electrode catalyst layers, a plurality of gas passages formed on each of the gas flow passage forming members and including a first gas passage and a second gas passage, a pair of separators respectively provided integrally with or independently from the pair of gas flow passage forming members, a pair of introducing passages for respectively introducing fuel gas and oxidation gas to the gas passages, and a pair of discharging passages for respectively discharging fuel off-gas and oxidation off-gas from the gas passages. The first gas passage and the second gas passage are shaped to generate a difference in flow resistance between the first gas passage and the second gas passage in each of the gas flow passage forming members.

The gas passages are preferably arranged in parallel, and the cross-sectional areas of the first gas passage and the second gas passage are preferably mutually different.

The first gas passage is preferably a straight gas passage having a low flow resistance of gas, and the second gas passage is preferably a meandering passage having a greater flow resistance than the flow resistance of the first gas passage.

A corresponding separator of the pair of separators preferably comes into contact with the surface of each of the gas flow passage forming members. Each of the gas flow passage forming members preferably includes a tabular part and a plurality of protrusions formed integrally with the tabular part and used for forming the gas passages. Further, it is preferably that: a plurality of water passages be formed between the separator and the tabular part; each of the water passages and at least one of the gas passages be in communication via a communication hole formed in the gas passage forming member; the depth of each of the water passages be set to be less than the depth of each of the gas passages; and water generated based on reaction of the fuel gas and the oxidation gas be drawn into the water passage based on capillary action through the communication hole from each of the gas passages, and discharged to the discharging passage based on the flow pressure of gas.

It is preferable that: the discharging passage include an inner wall; each of the water passages include an opening on the downstream side in the flow direction of the gas; the opening extend to the inner wall of the discharging passage; and in the discharging passage, a restricting part for increasing the flow velocity of gas be formed at a position corresponding to the opening of each of the water passages.

A gas passage that extends through the tabular part and the separator is preferably formed at a portion downstream in the flow direction of gas of each of the water passages of the tabular part and the separator of the gas passage forming member, and the gas passage is preferably in communication with the discharging passage and functions as a restricting part for increasing the flow velocity of gas.

In the present invention, seepage water and humidifying water generated during the power generation adhere, as retained water, to the passage having a greater flow resistance among the plurality of passages. Nevertheless, since seepage water and humidifying water hardly remain in a passage having a low flow resistance, the supply of gas to the electrode catalyst layer is performed appropriately. Thus, it is possible to reduce the region in which the supply of gas to the electrode catalyst layer is inhibited, and to inhibit reduction in the power generating efficiency.

Effects of the Invention

According to the present invention, gas is appropriately supplied to the electrode catalyst layer, and it is possible to inhibit reduction in power generating efficiency and to prevent power generation from stopping.

DETAILED DESCRIPTION OF THE PREFERRED EMBODIMENTS (First Embodiment)

A fuel cell according to a first embodiment of the present invention will now be described with reference to FIGS. 1 to 4 and 13.

Figure 13:
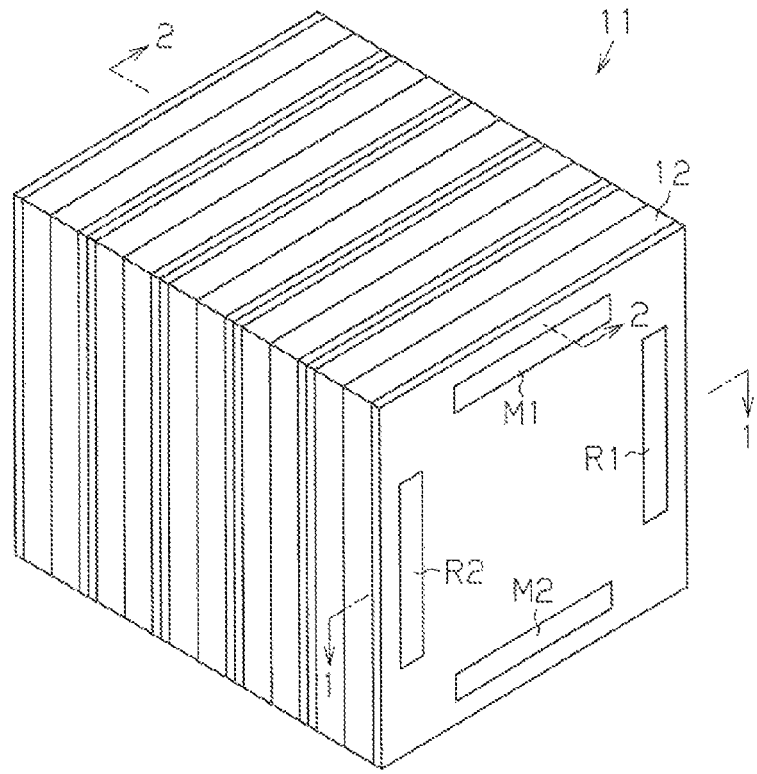
FIG. 13 is a perspective view showing a fuel cell stack.
Figure 14:
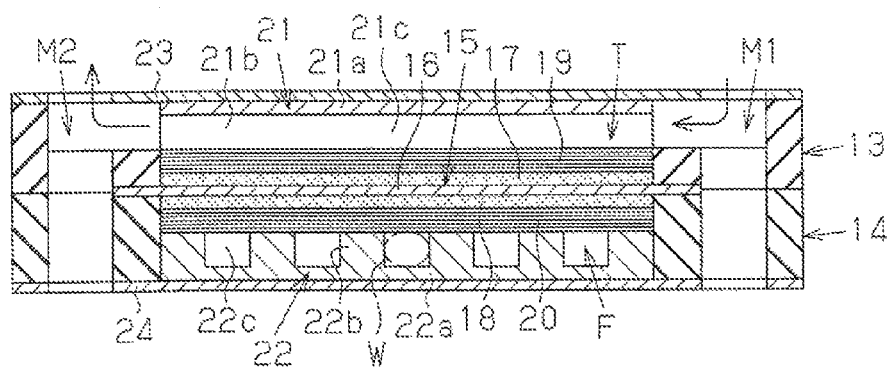
FIG. 14 is a cross-sectional view taken along line 2-2 of FIG. 13, showing power generation cells of a conventional fuel cell stack.
Figure 15:
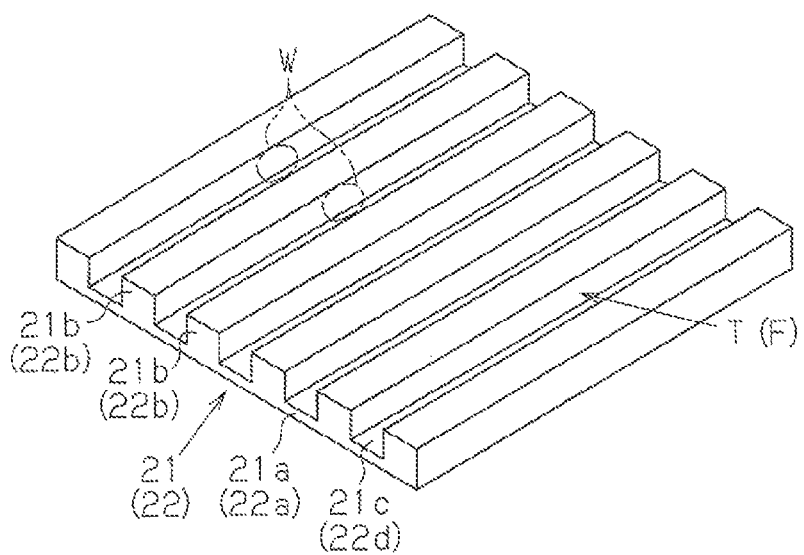
FIG. 15 is a perspective view showing conventional first and second gas flow passage forming members.
Figure 16:
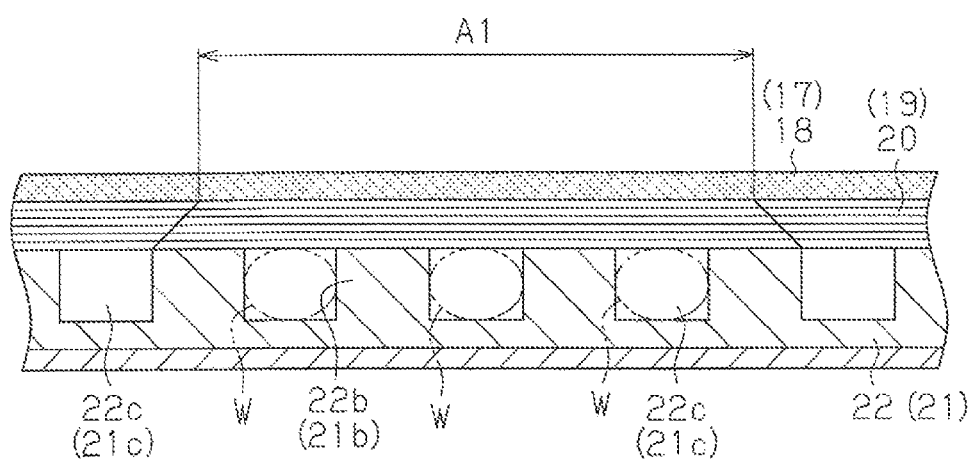
FIG. 16 is a partial enlarged cross-sectional view showing conventional power generation cells.

As shown in FIG. 13, a fuel cell stack 11 of the first embodiment is a solid polymer electrolyte fuel cell, and includes a plurality of stacked power generation cells 12.

Figure 1:
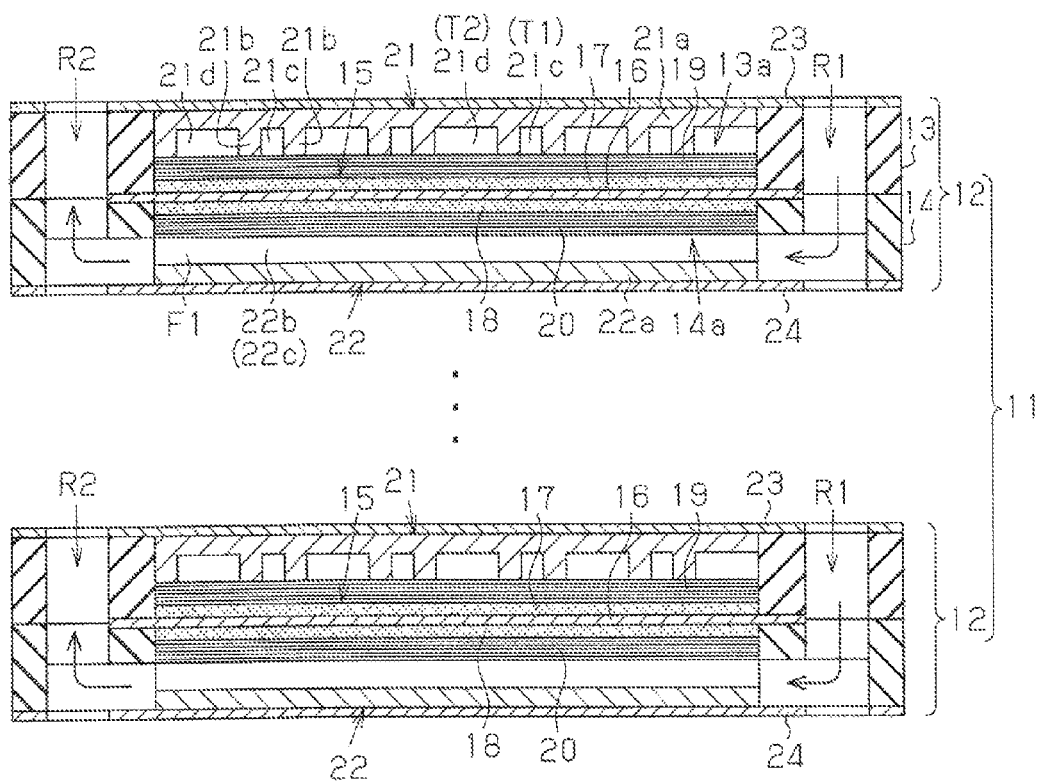
FIG. 1 is a cross-sectional view taken along line 1-1 of FIG. 13, showing a fuel cell according to a first embodiment of the present invention.

As shown in FIG. 1, the respective power generation cells 12 include square first and second frames 13, 14, and a membrane electrode assembly (MEA) 15 as an electrode structure located in the first and second frames 13, 14. The first and second frames 13, 14 are made of synthetic resin such as synthetic rubber. Passage spaces 13a of fuel gas are defined inside the first frame 13, and passage spaces 14a of oxidation gas are defined inside the second frame 14. The MEA 15 is located between the first and second frames 13, 14.

Figure 2:
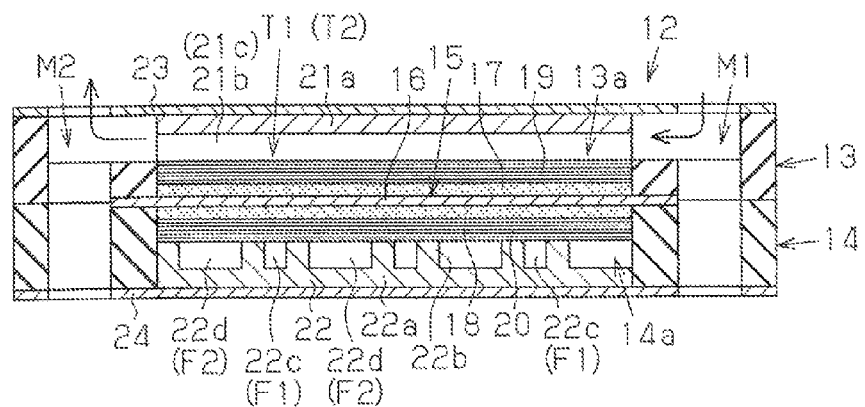
FIG. 2 is a cross-sectional view taken along line 2-2 of FIG. 13, showing power generation cells forming the fuel cell.

The respective power generation cells 12 include, as shown in FIGS. 1 and 2, a first gas passage forming member 21 housed in a passage space 13a of the fuel gas, and a second gas passage forming member 22 housed in a passage space 14a of the oxidation gas. The first gas passage forming member 21 is made of ferritic SUS (stainless steel), titanium alloy, or carbon. The second gas passage forming member 22 is made of ferritic SUS (stainless steel), titanium alloy, carbon, gold plated-titanium alloy, or gold alloy. In addition, the respective power generation cells 12 include a tabular first separator 23 and a second separator 24. The first separator 23 and the second separator 24 are made of ferritic SUS (stainless steel), titanium alloy, or carbon. The first separator 23 is bonded via the first frame 13 and a seal ring (not shown) of the first gas passage forming member 21. The second separator 24 is bonded via the frame 14 and a seal ring (not shown) of the second gas passage forming member 22.

The MEA 15 is formed by a solid electrolyte membrane 16, a first electrode catalyst layer 17 and a second electrode catalyst layer 18, and a first gas diffusion layer 19 and a second gas diffusion layer 20 having conductivity. The first electrode catalyst layer 17 is formed from an anode surface of the electrolyte membrane 16; that is, a catalyst laminated on the upper surface as viewed in the drawing. The second electrode catalyst layer 18 is formed from a cathode surface of the electrolyte membrane 16; that is, a catalyst laminated on the lower surface as viewed in the drawing. The gas diffusion layers 19, 20 respectively come into contact with the surface of the electrode catalyst layers 17, 18.

The solid electrolyte membrane 16 is formed from a fluorinated polymer membrane. The respective electrode catalyst layers 17, 18 contain carbon particles (not shown). Numerous catalyst particles made of platinum (Pt) are adhered to the surface of the carbon particles. The power generating efficiency of the fuel cell can be improved by using the catalyst effect of the catalyst particles. The respective gas diffusion layers 19, 20 are formed by carbon paper.

Figure 3:
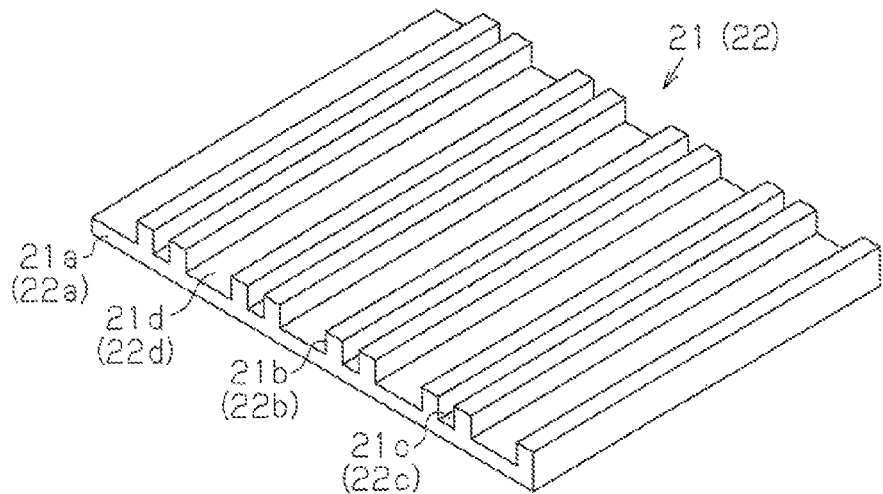
FIG. 3 is a perspective view showing first and second gas flow passage forming members.

The first and second gas flow passage forming members 21, 22 will now be described. The first gas passage forming member 21 positioned on the anode side and the second gas passage forming member 22 positioned on the cathode side have the same structure, but the mounting direction of the first and second gas flow passage forming members 21, 22 differs, for example, by 90°. The mounting directions of the first gas passage forming member 21 and the second gas passage forming member 22 may be the same directions or the opposite directions. The respective first gas flow passage forming members 21 are configured, as shown in FIGS. 1 and 3, from a base plate portion 21a, which comes into contact with the first separator 23, and a plurality of parallel protrusions 21b formed integrally with the surface of the base plate portion 21a. A first straight groove 21c and a second straight groove 21d, which respectively form a first gas passage T1 and a second gas passage T2 of fuel gas, are formed between the adjacent protrusions 21b as a result of being blocked by the surface of the gas diffusion layer 19. The second gas passage forming member 22 is formed by a base plate portion 22a, which comes into contact with the second separator 24, and a plurality of parallel protrusions 22b formed integrally with the surface of the base plate portion 22a. A first straight groove 22c and a second straight groove 22d, which respectively form a first passage F1 and a second passage F2 of oxidation gas, are formed between the adjacent protrusions 22b as a result of being blocked by the surface of the gas diffusion layer 20.

Figure 4:
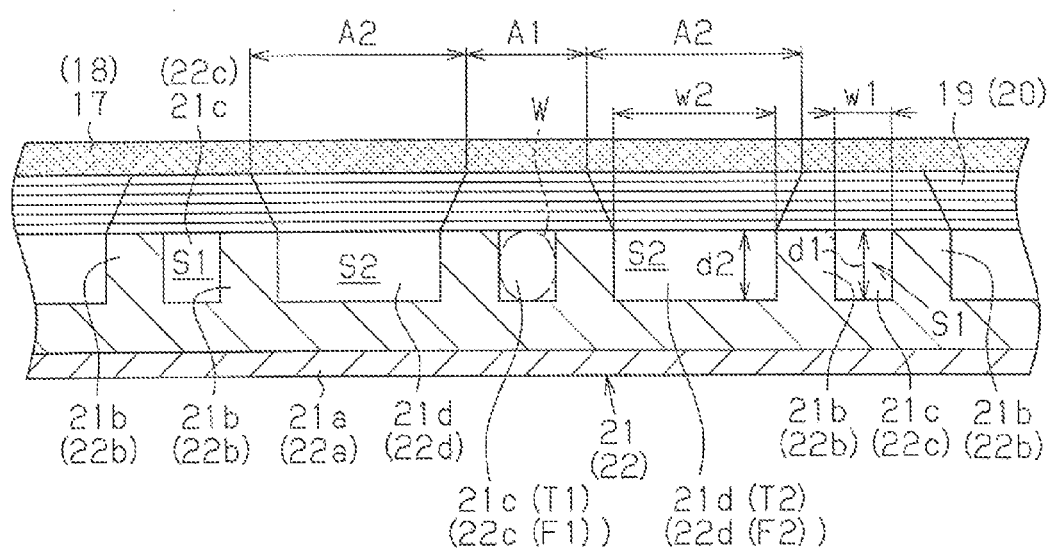
FIG. 4 is an enlarged cross-sectional view of a main part of the power generation cells.

As shown in FIG. 4, the depths d1, d2 of all the first and second straight grooves 21c, 21d (22c, 22d) are set to be the same, and the width w1 of the first straight groove 21c (22c) is set to be narrower than the width w2 of the second straight groove 21d (22d). Accordingly, the cross-sectional area S1 of fuel gas, or oxidation gas, of the first gas passage T1 (F1) is set to be narrow to increase the flow resistance of gas. The cross-sectional area S2 of fuel gas, or oxidation gas, of the second gas passage T2 (F2) is set to be broad so that the flow resistance of gas is smaller than the flow resistance of the first gas passage T1 (F1).

As shown in FIG. 2, an introducing passage M1 and a discharging passage M2 are formed on the first and second frames 13, 14 and the first and second separators 23, 24 of the respective power generation cells 12. The introducing passage M11 is provided for supplying fuel gas, or hydrogen gas, to the passages T1, T2 from a fuel gas supply source (not shown) such as a hydrogen gas cylinder. The discharging passage M2 is provided for discharging the fuel off-gas, which has not been used for power generation, outside the power generation cells 12. As shown in FIG. 1, an introducing passage R1 and a discharging passage R2 are formed on the first and second frames 13, 14 and the first and second separators 23, 24 of the respective power generation cells 12. The introducing passage R1 is provided for supplying oxidation gas, or air, to the passages F1, F2 from an oxidation gas supply source (not shown) such as a compressor. The discharging passage R2 is provided for discharging the oxidation off-gas, which has not been used for power generation, outside the power generation cells 12.

Operation of the fuel cell having the foregoing configuration will now be described.

In FIG. 2, fuel gas, or hydrogen gas, that has been humidified by a humidifier (not shown) is supplied from the introducing passage M1 into the passages T1, T2 (refer to FIG. 1) of the first gas passage forming member 21, and flows in the arrow direction. The fuel gas is diffused as a result of passing through the first gas diffusion layer 19 in the passages T1, T2, and uniformly supplied to the first electrode catalyst layer 17. In FIG. 1, oxidation gas, or oxygen gas, that has been humidified by a humidifier (not shown) is supplied to the passages F1, F2 (refer to FIG. 2) of the second gas passage forming member 22 through the introducing passage R1, and flows in the arrow direction. The oxidation gas is diffused as a result of passing through the second gas diffusion layer 20 in the passages F1, F2, and uniformly supplied to the electrode catalyst layer 18. As a result of supplying the fuel gas and the oxidation gas, and electrode reaction is generated in the MEA 15, and power is thereby generated. Consequently, the intended power is output from the fuel cell stack 11 formed by the plurality of stacked power generation cells 12.

Some of the fuel gas that has not been used for power generation is discharged, as fuel off-gas, outside the cell stack 11 through the discharging passage M2 from the passages T1, T2 of the first gas passage forming member 21. The oxidation gas that has not been used for power generation is discharged, as oxidation off-gas, outside the cell stack 11 through the discharging passage R2 from the first and second passages F1, F2.

Based on the foregoing electrode reaction in the MEA 15, water is generated in the passages F1, F2 of the cathode-side second gas passage forming member 22. The generated water is discharged, together with the humidifying water, to the discharging passage R2 based on the flow pressure of the oxidation gas flowing in the first and second passages F1, F2. Some of the generated water seeps into the cathode-side of the second electrode catalyst layer 18, the solid electrolyte membrane 16, the first electrode catalyst layer 17 and the first gas diffusion layer 19, and flows into the passages T1, T2 of the first gas passage forming member 21 as seepage water. The seepage water is discharged, together with the humidifying water, to the discharging passage M2 based on the flow pressure of the fuel gas flowing in the passages T1, T2.

Most of the generated water and humidifying water in the first and second passages F1, F2 of the cathode-side second gas passage forming member 22 is discharged toward the oxidation gas discharging passage R2 based on the flow pressure of the oxidation gas. The residual generated water and humidifying water act to adhere to the wall surface in the first and second passages F1, F2. The cross-sectional area 51 of the first passage F1 is set to be narrow. Thus, the generated water and humidifying water tend to remain due to the surface tension thereof, and the retained water W tends to adhere to and remain on a large part of the inner wall surface of the first passage F1 as shown in FIG. 4. Nevertheless, the cross-sectional area S2 of the second passage F2 is set to be broader than the cross-sectional area S1 of the first passage F1. Thus, it is difficult for the retained water W to remain in the second passage F2, and the retained water W is washed out by the flow pressure of the oxidation gas and hardly remains in the second passage F2. Thus, the supply of oxygen to the second electrode catalyst layer 18 corresponding to the first passage F1 blocked by the retained water W becomes insufficient, and the generation of power becomes partially impossible. Nevertheless, since the supply of oxidation gas to the second electrode catalyst layer 18 is appropriately carried out by the second passage F2, it is possible to inhibit reduction in the power generating efficiency.

In other words, as shown in FIG. 4, when one first passage F1 is blocked by the retained water W, the gas diffusion layer 19 is shielded by the two protrusions 22b and the retained water W, and the region where power cannot be generated is the region shown as A1. Nevertheless, since the second passage F2 will not be blocked by the retained water W, a region A2, which is broader than the region A1, is the region where power can always be generated.

Meanwhile, the seepage water and humidifying water in the first and second passages T1, T2 of the anode-side first gas passage forming member 21 are discharged toward the fuel gas discharging passage M2 based on the flow pressure of the fuel gas. The residual seepage water and humidifying water act to adhere to the inner wall surface of the first and second passages T1, T2. Since the cross-sectional area S1 of the first gas passage T1 is set to be narrow, the seepage water and humidifying water become the retained water W due to the surface tension thereof, and tend to adhere to and remain on a large area of the inner wall surface of the first gas passage T1. Nevertheless, since the cross-sectional area S2 of the second gas passage T2 is set to be broader than the cross-sectional area S1 of the first gas passage T1, it is difficult for the retained water W to remain in the second gas passage T2, and the retained water W is washed out by the flow pressure of the fuel gas and hardly remains in the second gas passage T2. Thus, the supply of fuel gas to the first electrode catalyst layer 18 is appropriately carried out by the second gas passage T2, and it is possible to inhibit reduction in the power generating efficiency.

According to the fuel cell of the first embodiment, the following advantages are yielded.

(1) The cross-sectional area S1 of the first gas passage T1 of the first gas passage forming member 21 is set to be narrow, and the cross-sectional area S2 of the second passage T2 is set to be broader than the cross-sectional area S1 of the first passage T1. Moreover, the cross-sectional area S1 of the first passage F1 of the second gas passage forming member 22 is set to be narrow, and the cross-sectional area S2 of the second passage F2 is set to be broader than the cross-sectional area S1 of the first passage F1. Thus, as described above, while the seepage water/humidifying water and the generated water/humidifying water adhere to the anode-side first passage T1 and the cathode-side first passage F1 as the retained water W, it is possible to prevent the retained water W from adhering to the second passage T2 and the second passage F2. Thus, it is possible to prevent reduction in the power generating efficiency by inhibiting the decrease in the supply of fuel gas to the first gas diffusion layer 19 and the first electrode catalyst layer 17 and the supply of oxidation gas to the second gas diffusion layer 20 and the second electrode catalyst layer 18.

(2) Even if most of the first passage T1 on the anode-side of the power generation cell 12 is blocked by the retained water W, the fuel gas is supplied by most of the second passage T2. Moreover, even if most of the first passage F1 on the cathode-side is blocked by the retained water W, the oxidation gas is supplied by most of the second passage F2. Accordingly, it is possible to prevent the non-supply of fuel gas and oxidation gas to the entire area of the first and second electrode catalyst layers 17, 18 of one power generation cell 12, thereby prevent the power generation cell 12 from falling into a state of not being able to generate power, and consequently prevent the power generation by the fuel cell stack 11 from stopping.

(3) Employed is a simple configuration of changing the widths w1, w2 of the first and second straight grooves 21c, 21d of the first gas passage forming member 21, and the first and second straight grooves 22c, 22d of the second gas passage forming member 22, respectively. Thus, the first and second gas flow passage forming members 21, 22 can be manufactured easily and the production costs can be reduced.

(Second Embodiment)

A fuel cell according to a second embodiment of the present invention will now be described with reference to FIGS. 5 to 8. In the following embodiments, components having similar functions as those in the first embodiment are given the same reference numerals, and the descriptions thereof are omitted. Operations and advantages of components different from those in the first embodiment will mainly be discussed.

Figure 5:
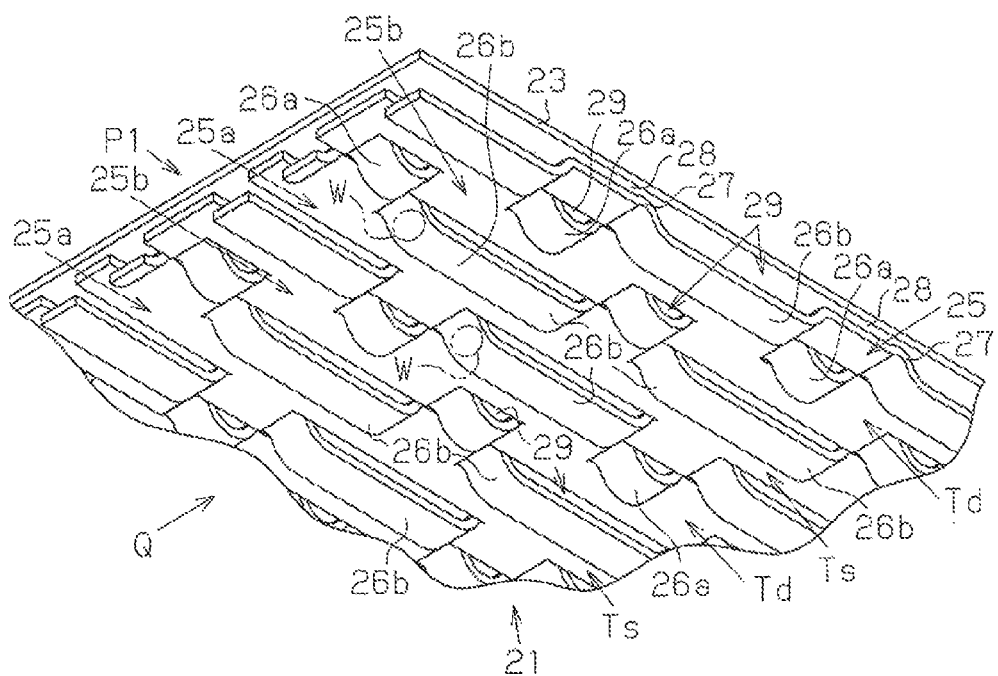
FIG. 5 is a partial perspective view showing a first gas passage forming member and a separator of a fuel cell according to a second embodiment of the present invention.
Figure 7:
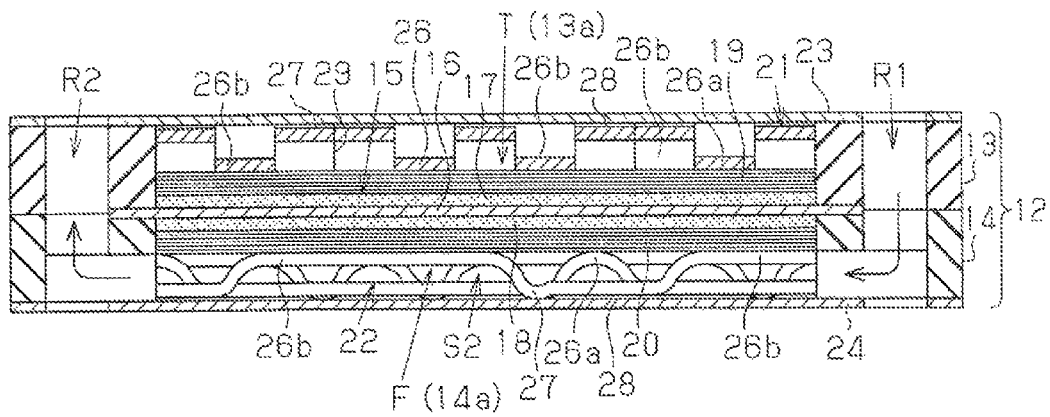
FIG. 7 is a cross-sectional view taken along line 1-1 of FIG. 13, showing the power generation cells forming the fuel cell according to the second embodiment.

As shown in FIGS. 5 and 7, the first gas passage forming member 21 includes a tabular material 25, and a plurality of first projections 26a and a plurality of second projections 26b are formed, in a manner of being cut and raised, at numerous locations on the tabular material 25. The first projections 26a and the second projections 26b are respectively protrusions for forming the passage T, and protrude toward the first gas diffusion layer 19 (refer to FIG. 7). As a result of the first projections 26a and the second projections 26b respectively coming into contact with the first gas diffusion layer 19, the fuel gas passage T is formed between the tabular material 25 and the first gas diffusion layer 19. The passage T also functions as the passage space 13a. When viewed in direction Q, which is orthogonal to a gas flow direction P1, the first projections 26a have a semicircular shape. Since the second projections 26b have a flat trapezoidal shape, the contact area of the second projections 26b and the second gas diffusion layer 20 is wide.

Additionally formed on the tabular material 25 is a plurality of small and low third projections 27 in a manner of corresponding to the first and second projections 26a, 26b and to be positioned upstream relative to the gas flow direction P1. The respective third projections 27 are protrusions for forming the water passage 28, and are extrusion-molded to protrude toward the first separator 23 as shown in FIGS. 5 and 7. As a result of the respective third projections 27 coming into contact with the first separator 23, a plurality of water passages 28 is formed between the tabular material 25 and the first separator 23. A communication hole 29 extending through the first and second projections 26a, 26b in the direction Q, which is orthogonal to the gas flow direction P1, is formed in the first projections 26a and the second projections 26b, respectively. In other words, the communication hole 29 is formed, when viewed from the gas flow direction P1, to respectively open at two locations; namely, the left side and the right side of the respective first projections 26a, and at two locations, namely, the left side and the right side of the respective second projections 26b. The passage T and the water passage 28 are in mutual communication based on the communication hole 29.

Figure 8:
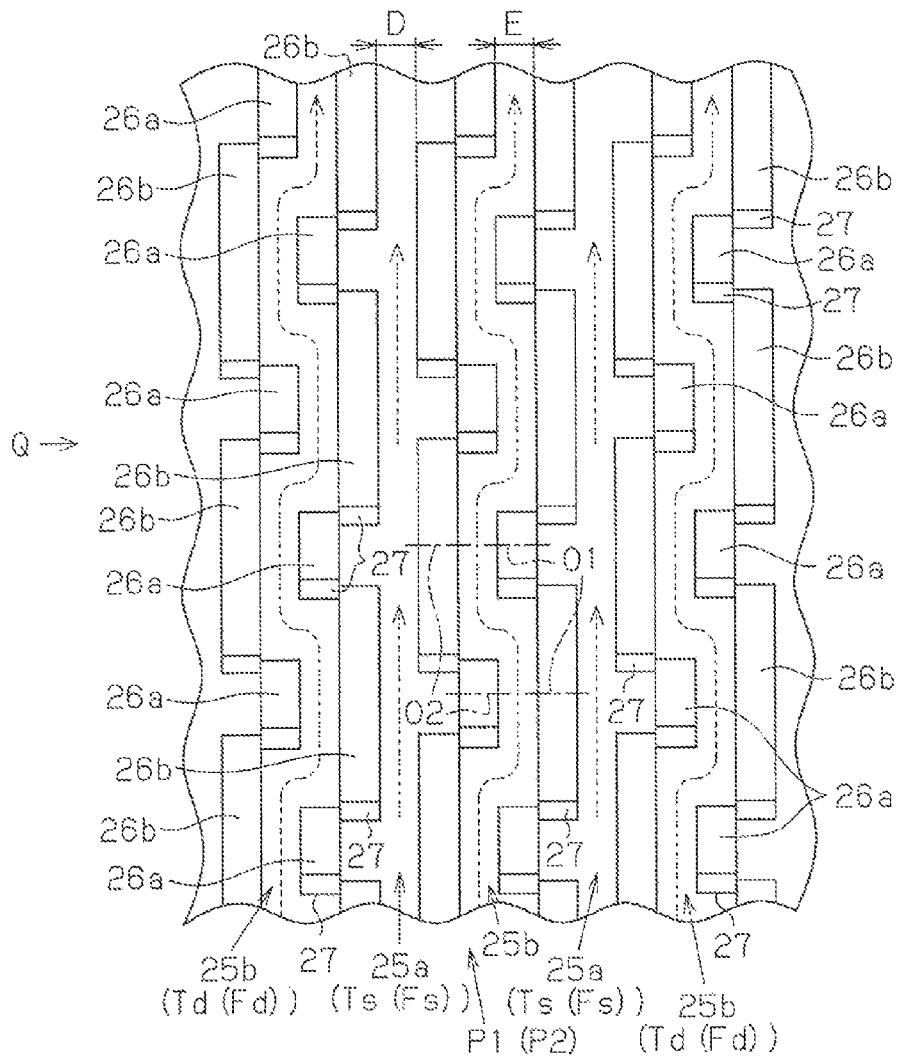
FIG. 8 is a partial plan view showing the first and second gas flow passage forming members of the power generation cells of FIG. 7.

The semicircular-shaped first projections 26a are arranged at a predetermined pitch in the gas flow direction P1 as shown in FIGS. 5 and 7. The flat trapezoidal shape second projections 26b are linearly arranged at a predetermined pitch in the gas flow direction P1. The pair of first and second projections 26a, 26b adjacent to each other with respect to the direction Q, which is orthogonal to the gas flow direction P1, is arranged, as shown in FIG. 8, so that a center O2 of the second projection 26b and a center O1 of the first projection 26a coincide with each other with respect to the gas flow direction P1. A strip-shaped tabular part 25a without the first and second projections 26a, 26b relative to the gas flow direction P1 is formed between the adjacent rows of the second projections 26b extending in the gas flow direction P1. The passage T includes a strip-shaped straight passage Ts having a small gas flow resistance between the strip-shaped tabular part 25a and the first separator 23. The passage T includes, separate from the foregoing straight passage Ts, a meandering passage Td having a great gas flow resistance. The meandering passage Td is formed by a meandering tabular part 25b formed between the first projection 26a and the second projection 26b, and the first separator 23.

Figure 6:
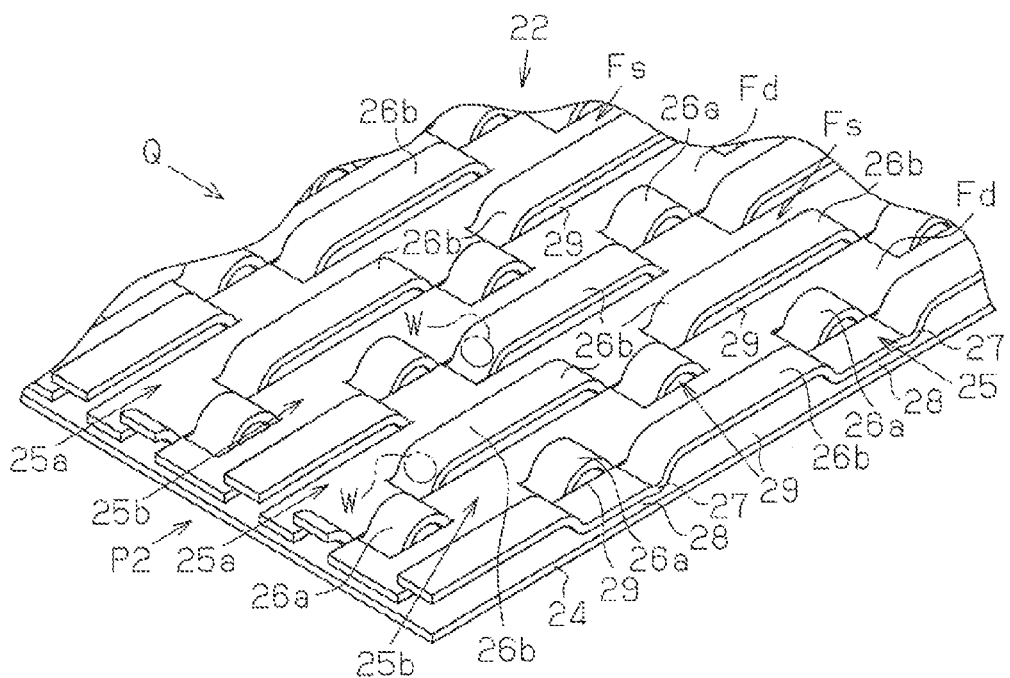
FIG. 6 is a partial perspective view showing a second gas passage forming member and a separator of the fuel cell according to the second embodiment of the present invention.

The cathode-side second gas passage forming member 22 has the same structure as the first gas passage forming member 21 shown in FIG. 6, but the oxidation gas flow direction P2 differs from the fuel gas flow direction P1 by 90°. In other words, the oxidation gas flow direction P2 is orthogonal to the fuel gas flow direction P1 of the first gas passage forming member 21. The passage F corresponding to the passage T of the second gas passage forming member 22 includes a straight passage Fs corresponding to the straight passage Ts, and a meandering passage Fd corresponding to the meandering passage Td, but the same reference numerals are given and the explanation thereof is omitted.

In the second embodiment, the height of the portion protruding from the strip-shaped tabular part 25a of the first projections 26a and the second projections 26b; that is, the depth of the straight passage Ts (Fs) and the meandering passage Td (Fd) is set to be within the range of 30 µm to 1000 µm, preferably within the range of 30 µm to 300 µm, and set, for instance, to 200 µm. The height of the portion protruding from the strip-shaped tabular part 25a of the third projections 27; that is, the depth of the water passage 28 is set to be within the range of 10 µm to 50 µm, and is set, for instance, to 30 µm. Since the respective water passages 28 are formed in a slit shape and the depth of the respective water passage 28 is formed to be shallower than the depth of the straight passage Ts (Fs) and the meandering passage Td (Fd), it is easier for the water in the straight passage Ts (Fs) and the meandering passage Td (Fd) to be drawn into the water passage 28, through the communication hole 29, based on the capillary action of the slit-shaped water passage 28. The width D of the strip-shaped tabular part 25a shown in FIG. 8 is set to be with the range of 100 µm to 300 µm, and the width E of the tabular part 25b is set to be within the range of 50 µm to 150 µm.

Operation of the fuel cell of the second embodiment will now be described.

In FIG. 7, most of the fuel gas containing the humidifying water supplied from the introducing passage M1 to the straight passage Ts shown in FIGS. 5 and 8 during the power generation advances in a straight line as shown with the broken line arrow of FIG. 8, and some of the fuel gas comes into contact with the surface of the left and right second projections 26b on the upstream side. The humidifying water and seepage water contained in the fuel gas that has come into contact with the surface, as the retained water W, become adhered to and grow on that surface. The retained water W is pushed by the flow pressure of the fuel gas, and most of that fuel gas enters the inside of the second projection 26b through the communication hole 29 of the second projection 26b, and enters the water passage 28 based on the capillary action of the water passage 28. The water that entered the water passage 28 moves to the downstream side due to the flow pressure of the fuel gas.

Meanwhile, most of the fuel gas containing the humidifying water supplied to the meandering passage Td meanders as shown with the broken line arrow of FIG. 8, and comes into contact with the surface of the first projection 26a on the upstream side. The humidifying water and seepage water contained in the fuel gas that has come into contact with the surface, as the retained water W, also become adhered to and grow on that surface. The retained water W is pushed by the flow pressure of the fuel gas, enters the inside of the first projection 26a through the left and right communication holes 29 of the first projection 26a, and enters the water passage 28 based on the capillary action of the water passage 28. The water that entered the water passage 28 also moves to the downstream side due to the flow pressure of the fuel gas.

Advantages of the second embodiment will now be described.

(1) Two types of passages; namely, a straight passage Ts (Fs) of low pressure loss and capable of preventing the adherence of retained water, and a meandering passage Td (Fd) of high pressure loss and to which retained water tends to adhere are formed on the first and second gas flow passage forming members 21, 22. Thus, even in cases where the retained water remains in the meandering passage Td (Fd) and the fuel gas and the oxidation gas are not supplied to a part of the electrode catalyst layers 17, 18, the fuel gas and the oxidation gas are supplied from the straight passage Ts (Fs) to the electrode catalyst layers 17, 18. Thus, it is possible to prevent reduction in the power generating efficiency. Moreover, it is possible to prevent the non-generation of power by the power generation cell 12, and prevent the power generation of the fuel cell stack 11 from stopping.

(2) A plurality of water passages 28 is formed between the tabular material 25 and the first separator 23 of the anode-side first gas passage forming member 21. The depth of the respective water passages 28 is set to be shallower than the depth of the passage T. The seepage water and humidifying water in the passage T formed between the tabular material 25 and the first gas diffusion layer 19 are guided to the water passage 28 based on capillary action via the communication hole 29 formed in the first projection 26. The seepage water and humidifying water that have been guided into the water passage 28 are discharged toward the fuel gas discharging passage M2 by the flow pressure of the fuel gas. Since the fuel gas is appropriately supplied to the first electrode catalyst layer 17 based on this kind of configuration, the hydrogen deficient state of the first electrode catalyst layer 17 can be avoided, and the power generating efficiency will improve.

Moreover, the water in the water passage 28 is discharged to the fuel gas discharging passage M2. Consequently, since the seepage water and humidifying water are inhibited from remaining in the passage T and the pressure loss of the fuel gas flowing in the passage T caused by water such as seepage water and humidifying water is reduced, the power generating efficiency will improve. In addition, it is possible to prevent the rise in potential of the anode-side first electrode catalyst layer 17, which is caused by the hydrogen deficient state of the first electrode catalyst layer 17. Accordingly, since the corrosion of the first gas passage forming member 21 is prevented, the durability of the first gas passage forming member 21 can be improved. Thus, the standard for choosing the material of the first gas passage forming member 21 is liberalized, and inexpensive materials can be used as the material of the first gas passage forming member 21, whereby the material costs can be reduced.

(3) A plurality of water passages 28 is provided between the tabular material 25 and the second separator 24 of the cathode-side second gas passage forming member 22. Thus, the generated water and humidifying water in the passage F of the cathode-side second gas passage forming member 22 are discharged toward the oxidation gas discharging passage R2 by the water passage 28. Consequently, since the generated water and humidifying water are inhibited from remaining in the passage F of the second gas passage forming member 22 and the pressure loss of the oxidation gas flowing in the passage F caused by the generated water is reduced, the power generating efficiency will improve. Moreover, since oxidation gas is appropriately supplied to the electrode catalyst layer 18 and an oxidation gas deficient state is avoided, the power generating efficiency will improve.

(4) The inner peripheral surface of the inner space of the first projection 26 is formed as a semicircular surface as shown in FIGS. 5 and 6. Thus, the seepage water and generated water that have been generated in the passages Ts (Fs), Td (Fd) enter the inner space of the first projection 26 and are stably maintained as the retained water W, and the water retentivity of the first projection 26 can be improved. In other words, the retained water W that adheres to the surface of the first and second gas diffusion layers 19, 20 tends to become a spherical shape due to the surface tension, the retained water W can more easily flow into the semicircular cylindrical inner space of the first projection 26. Thus, the growth of the retained water W on the surface of the first and second gas diffusion layers 19, 20 is inhibited, the supply shortage of gas caused by water is resolved, and the power generating performance is thereby improved. Moreover, if the power generation by the fuel cell is stopped while the retained water W is still adhered to the surface of the first and second gas diffusion layers 19, 20, the first and second gas diffusion layers 19, 20 become partially deteriorated due to the water. The present embodiment is able to prevent the foregoing deterioration and improve the durability of the diffusion layers 19, 20.

(5) In comparison to a separator in which only the semicircular-shaped first projections 26 are interspersed, the area that comes into contact with the second gas diffusion layer 20 is broader due to the flat trapezoidal shape second projections 26b. Thus, it is possible to prevent the semicircular-shaped first projections 26 from digging into the second gas diffusion layer 20, and the electrical resistance against the generated electricity can be reduced. Meanwhile, the capability of retaining the generated water and humidifying water as retained water is also improved by the plurality of semicircular-shaped first projections 26.

(6) Since the pressure loss of the gas passage can be reduced by the straight passages Ts, Fs, for instance, it is possible to reduce the power loss of peripheral equipment such as the compressor for supplying gas.

(Modifications)

The present invention may also be modified into the following embodiments.

Figure 9:
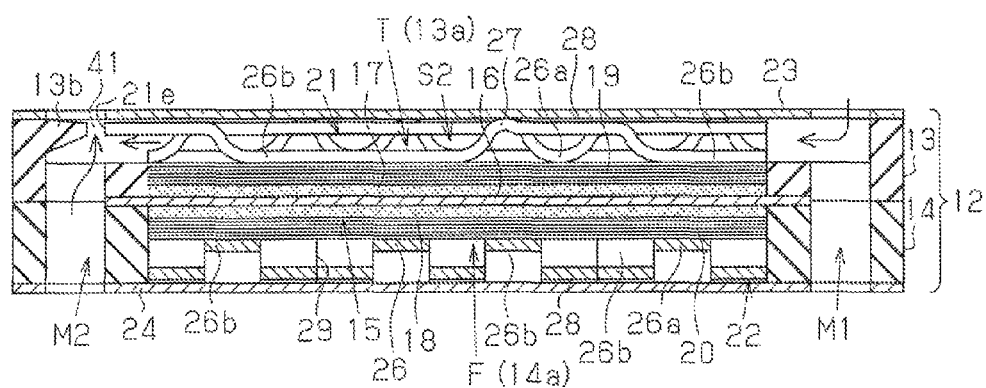
FIG. 9 is a cross-sectional view taken along line 2-2 of FIG. 13, showing a power generation cells forming the fuel cell according to a third embodiment of the present invention.

In the fuel gas discharging passage M2, a restricting part for increasing the flow velocity of the fuel gas may be formed. Specifically, as shown in FIG. 9, the opening of the downstream edge 21e of the first gas passage forming member 21; that is, the opening on the downstream side of the water passage 28 extends up to the side wall of the discharging passage M2. In the discharging passage M2, the wall surface facing the downstream edge 21e is provided with the protruding part 13b. A restricting part 41 positioned near the opening on the downstream side of the water passage 28 is formed by the foregoing protruding part 13b and the edge 21e. The cross-sectional area of the discharging passage M2 in the restricting part 41 becomes narrow, and the flow velocity of the fuel gas in the restricting part 41 is thereby increased. In the present embodiment, since the water existing in the water passage 28 is drawn out to the discharging passage M2 due to the Venturi effect of the fuel gas with a high flow velocity flowing through the restricting part 41, the water is discharged more appropriately. As with the foregoing configuration, a restricting part may also be formed in the oxidation gas discharging passage R2 in order to increase the flow velocity of oxidation gas.

Figure 10:
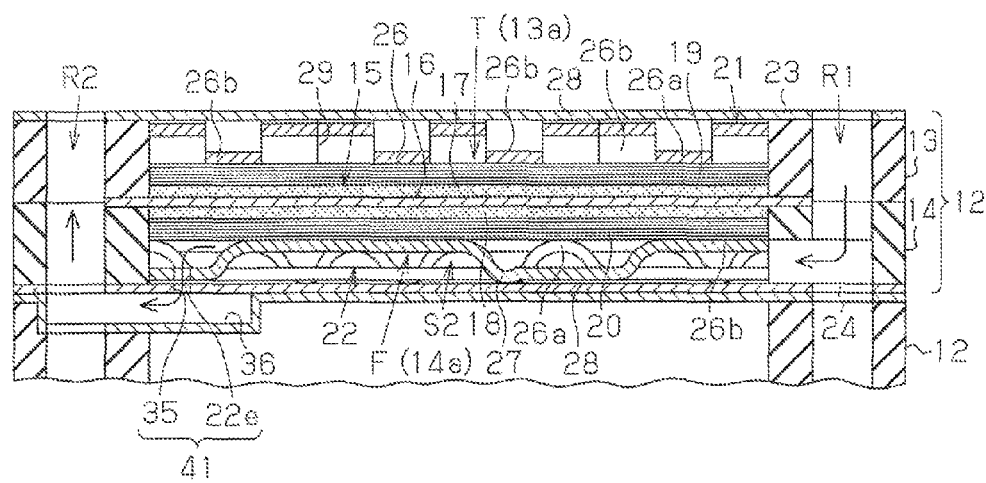
FIG. 10 is a cross-sectional view taken along line 1-1 of FIG. 13, showing a power generation cells forming the fuel cell according to a fourth embodiment of the present invention.

In the second embodiment, as shown in FIG. 10, it is also possible to form a drain hole 35 in the second separator 24, and provide the gas passage 22e at a position corresponding to the drain hole 35. Based on the foregoing configuration, the gas passage 22e and the drain hole 35 will be in communication with the oxidation gas discharging passage R2 through the communication path 36, and become the path of oxidation gas. The gas passage 22e and the drain hole 35 function as the restricting part 41 for increasing the flow velocity of oxidation gas. In the present embodiment, since the water existing in the water passage 28 is appropriately drawn out to the communication path 36 due to the Venturi effect of the oxidation gas with a high flow velocity flowing through the restricting part 41, the water is discharged more appropriately. As with the foregoing configuration, a restricting part may also be formed in the fuel gas discharging passage M2 in order to increase the flow velocity of fuel gas.

Figure 11:
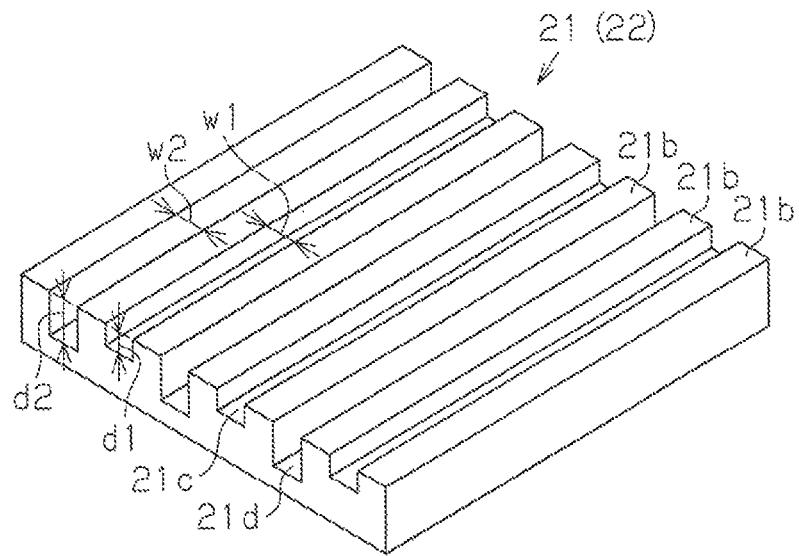
FIG. 11 is a perspective view showing first and second gas flow passage forming members of a modification of the first embodiment.

As shown in FIG. 11, the depths d1, d2 of the first and second straight grooves 21c, 21d of the first gas passage forming member 21 may also be set to be different from each other. Consequently, the cross-sectional area S1 of the first passage T1 is set to be narrow and the gas flow resistance will increase, and the cross-sectional area S2 of the second passage T2 is set to be broad and the gas flow resistance will decrease.

Figure 12:
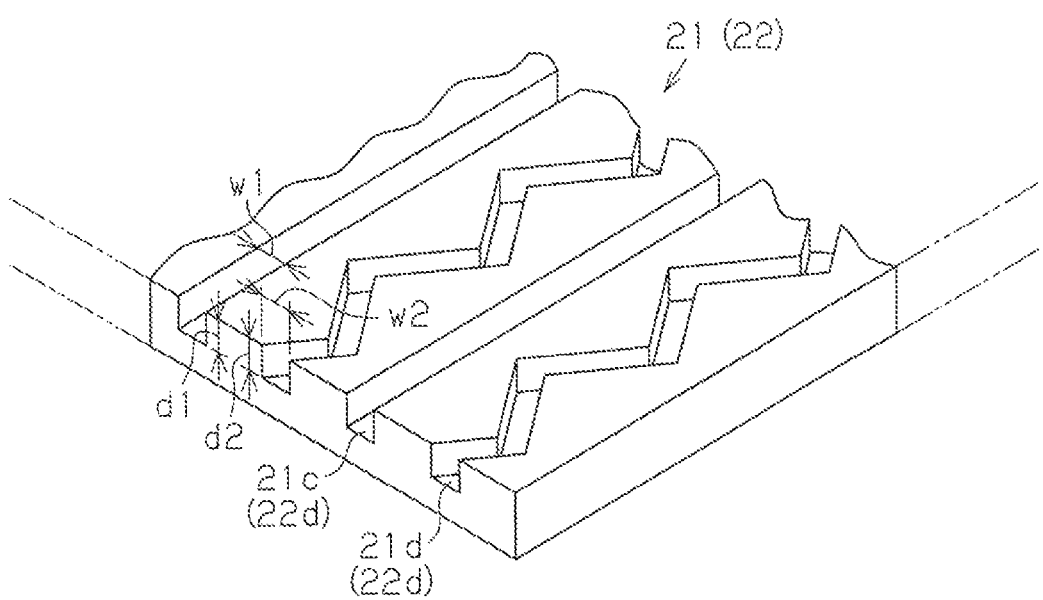
FIG. 12 is a perspective view showing the first and second gas flow passage forming members of a modification of the first embodiment.

As shown in FIG. 12, the first passage T1 may be a meandering passage Td with a large gas flow resistance in a plan view, and the second passage T2 may be a straight passage Ts with a small gas flow resistance in a plan view. In the present embodiment, the widths w1, w2 of the first and second straight grooves 21c, 21d and the first and second straight grooves 22c, 22d may also respectively be the same.

Although not illustrated, the water passage 28 may be provided only to the anode side in the second embodiment. According to the foregoing configuration, it is possible to inhibit the reduction in supply of the fuel gas to the anode-side first electrode catalyst layer 17, improve the power generating efficiency of the fuel cell, and improve the durability of the anode-side second gas passage forming member 22 and the cathode-side electrode catalyst layer 18. Moreover, the water passage 28 may be provided only to the cathode side. According to the foregoing configuration, it is possible to inhibit the reduction in supply of the oxidation gas to the cathode-side of the second electrode catalyst layer 18, and improve the power generating efficiency of the fuel cell.

A plurality of straight passages having a large cross-sectional area and a plurality of meandering passages having a small cross-sectional area may also be combined as needed.

The cross-sectional areas of the passages may be changed to be three stages or more. The cross-sectional areas may be changed alternately or with regularity, or changed randomly.

A groove for causing cooling water to pass through the first and second separators 23, 24 of the power generation cells 12 may also be formed in the fuel cell of the respective embodiments.

In a fuel cell in which the water passage 28 is provided only to the cathode side, the anode-side first gas passage forming member 21 and the first separator 23 may be formed integrally. Moreover, the first frame 13 and the first separator 23 may also be formed integrally using a metal material through, for instance, forging.

In a fuel cell in which the water passage 28 is provided only to the anode side, the cathode-side second gas passage forming member 22 and the second separator 24 may be formed integrally. Moreover, the frame 14 and the second separator 24 may be formed integrally using a metal material through, for instance, forging.

The invention claimed is:

1. A fuel cell, comprising:
    an electrolyte membrane including an anode surface and a cathode surface;
    a pair of electrode catalyst layers respectively laminated on the anode surface and on the cathode surface of the electrolyte membrane;
    a pair of gas flow passage forming members respectively laminated on the pair of electrode catalyst layers;
    a plurality of gas passages formed on each of the gas flow passage forming members and including a first gas passage and a second gas passage;
    a pair of separators respectively provided integrally with or independently from the pair of gas flow passage forming members;
    a pair of introducing passages for respectively introducing fuel gas and oxidation gas to the gas passages; and
    a pair of discharging passages for respectively discharging fuel off-gas and oxidation off-gas from the gas passages,
    wherein the first gas passage and the second gas passage are shaped to generate a difference in flow resistance between the first gas passage and the second gas passage in each of the gas flow passage forming members,
    a corresponding separator of the pair of separators comes into contact with the surface of each of the gas flow passage forming members,
    each of the gas flow passage forming members includes:
        a tabular part; and
        a plurality of protrusions formed integrally with the tabular part and used for forming the gas passages, and
    wherein
    a plurality of water passages are formed between the separator and the tabular part,
    each of the water passages and at least one of the gas passages are in communication via a communication hole formed in the gas passage forming member,
    the depth of each of the water passages is set to be less than the depth of each of the gas passages, and
    water generated based on reaction of the fuel gas and the oxidation gas is drawn into the water passage based on capillary action through the communication hole from each of the gas passages, and discharged to the discharging passage based on the flow pressure of gas.

2. The fuel cell according to claim 1, wherein the first gas passage is a straight gas passage having a low flow resistance of gas, and the second gas passage is a meandering passage having a greater flow resistance than the flow resistance of the first gas passage.

3. The fuel cell according to claim 1, wherein
    the discharging passage includes an inner wall,
    each of the water passages includes an opening on the downstream side in the flow direction of the gas,
    the opening extends to the inner wall of the discharging passage, and
    in the discharging passage, a restricting part for increasing the flow velocity of gas is formed at a position corresponding to the opening of each of the water passages.

4. The fuel cell according to claim 1, wherein
    a gas passage that extends through the tabular part and the separator is formed at a portion downstream in the flow direction of gas of each of the water passages of the tabular part and the separator of the gas passage forming member, and
    the gas passage is in communication with the discharging passage and functions as a restricting part for increasing the flow velocity of gas.

\* \* \* \* \*